(12) United States Patent
Jansen

(10) Patent No.: US 8,505,792 B1
(45) Date of Patent: Aug. 13, 2013

(54) PHONE MOUNTING ASSEMBLY

(76) Inventor: Johan L. Jansen, North Las Vegas, NV (US)

( * ) Notice: Subject to any disclaimer, the term of this patent is extended or adjusted under 35 U.S.C. 154(b) by 250 days.

(21) Appl. No.: 12/909,920

(22) Filed: Oct. 22, 2010

(51) Int. Cl.
*B60R 7/00* (2006.01)

(52) U.S. Cl.
USPC .......................... 224/276; 224/929; 24/129 W

(58) Field of Classification Search
USPC ................. 224/276, 275, 420, 660, 666, 667, 224/671, 674, 929; 24/115 A, 129 D, 129 R, 24/129 W, 198, 265 WS, 570; 108/44; 74/558.5
See application file for complete search history.

(56) References Cited

U.S. PATENT DOCUMENTS

| | | | | |
|---|---|---|---|---|
| 2,025,886 | A * | 12/1935 | Nordstrom | 224/587 |
| 3,884,092 | A * | 5/1975 | Raudebaugh | 74/558 |
| 5,042,318 | A * | 8/1991 | Franz | 74/558 |
| 5,060,581 | A | 10/1991 | Malinski | |
| 5,182,838 | A * | 2/1993 | Stenner | 24/712.7 |
| 5,193,777 | A * | 3/1993 | Faulstich | 248/441.1 |
| 5,385,283 | A * | 1/1995 | Shioda | 224/276 |
| 5,711,469 | A | 1/1998 | Gormley et al. | |
| 5,806,731 | A * | 9/1998 | Mark | 224/250 |
| D408,134 | S | 4/1999 | Hartmann et al. | |
| 6,209,767 | B1 | 4/2001 | Liou | |
| 6,760,569 | B1 | 7/2004 | Chen | |
| D501,990 | S | 2/2005 | Carr | |
| 6,921,006 | B2 * | 7/2005 | Bauer | 224/164 |
| D507,872 | S | 8/2005 | Watson | |
| 2005/0077334 | A1 * | 4/2005 | Craig | 224/276 |
| 2006/0113340 | A1 * | 6/2006 | Goradesky | 224/269 |
| 2007/0029359 | A1 * | 2/2007 | Smith | 224/276 |
| 2007/0251963 | A1 | 11/2007 | Lin | |
| 2009/0065540 | A1 * | 3/2009 | Pantoja | 224/275 |

* cited by examiner

*Primary Examiner* — Nathan J Newhouse
*Assistant Examiner* — Todd Anderson

(57) ABSTRACT

A phone mounting assembly is provided for supporting a portable phone on a steering wheel in an accessible position to facilitate hands-free use of the phone. The assembly includes a steering wheel and a connection member couplable to the steering wheel. The connection member has a planar medial section designed for insertion into a clip of a cell phone holder. A first stopping member is coupled to the medial section such that the first stopping member restricts lateral movement of the clip of the cell phone holder on the connection member.

19 Claims, 3 Drawing Sheets

PHONE MOUNTING ASSEMBLY

BACKGROUND OF THE DISCLOSURE

Field of the Disclosure

The disclosure relates to phone mounting devices and more particularly pertains to a new phone mounting device for supporting a portable phone on a steering wheel in an accessible position to facilitate hands-free use of the phone.

SUMMARY OF THE DISCLOSURE

An embodiment of the disclosure meets the needs presented above by generally comprising a steering wheel and a connection member couplable to the steering wheel. The connection member has a planar medial section designed for insertion into a clip of a cell phone holder. A first stopping member is coupled to the medial section such that the first stopping member restricts lateral movement of the clip of the cell phone holder on the connection member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
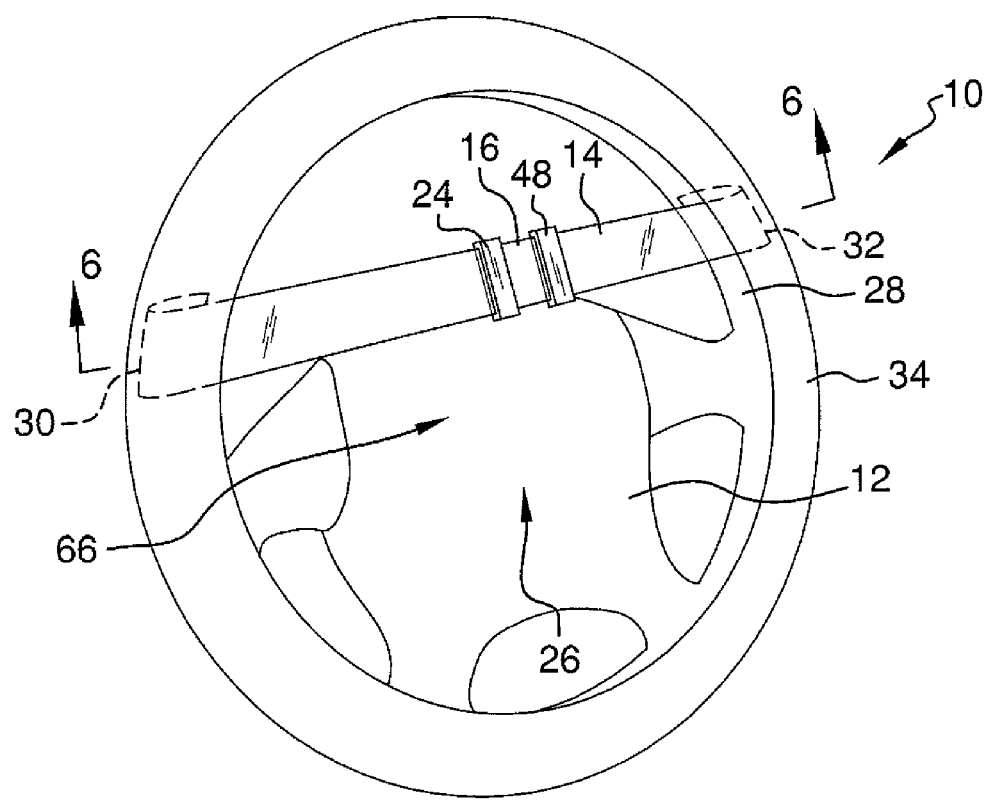
FIG. 1 is a top front side perspective view of a phone mounting assembly according to an embodiment of the disclosure.
Figure 2:
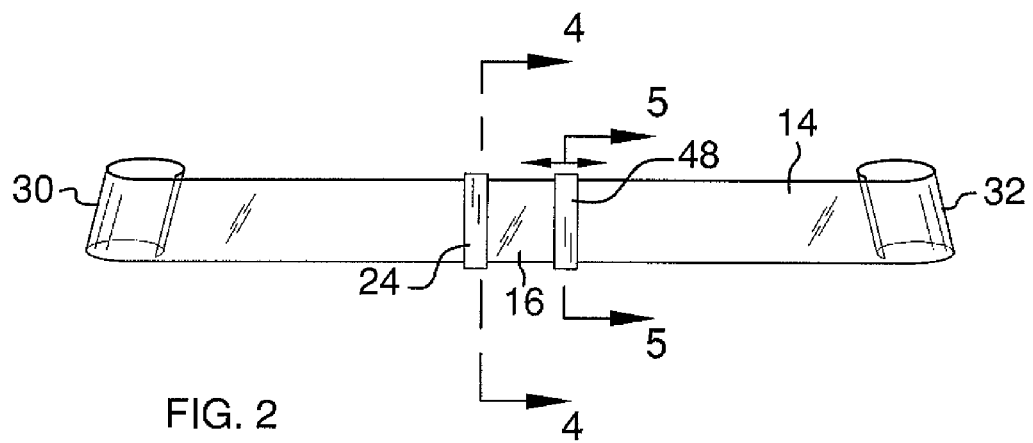
FIG. 2 is a front view of an embodiment of the disclosure.
Figure 3:
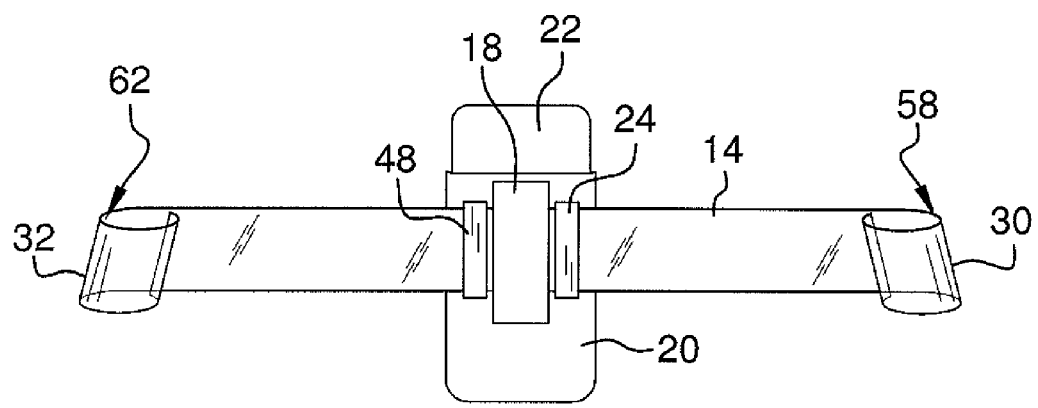
FIG. 3 is a back view of an embodiment of the disclosure.
Figures 4, 5:
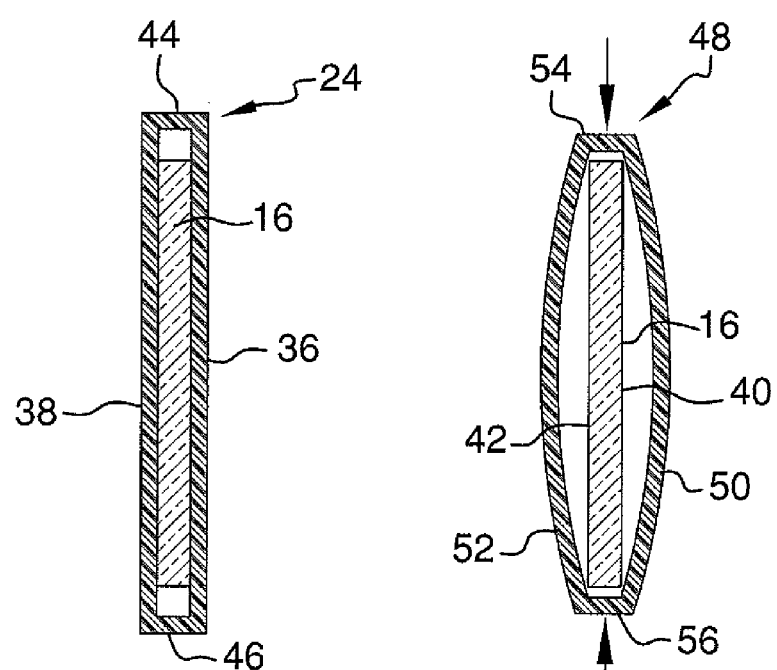
FIG. 4 is a cross-sectional view of an embodiment of the disclosure taken along line 4-4 of FIG. 2.
FIG. 5 is a cross-sectional view of an embodiment of the disclosure taken along line 5-5 of FIG. 2.
Figure 6:
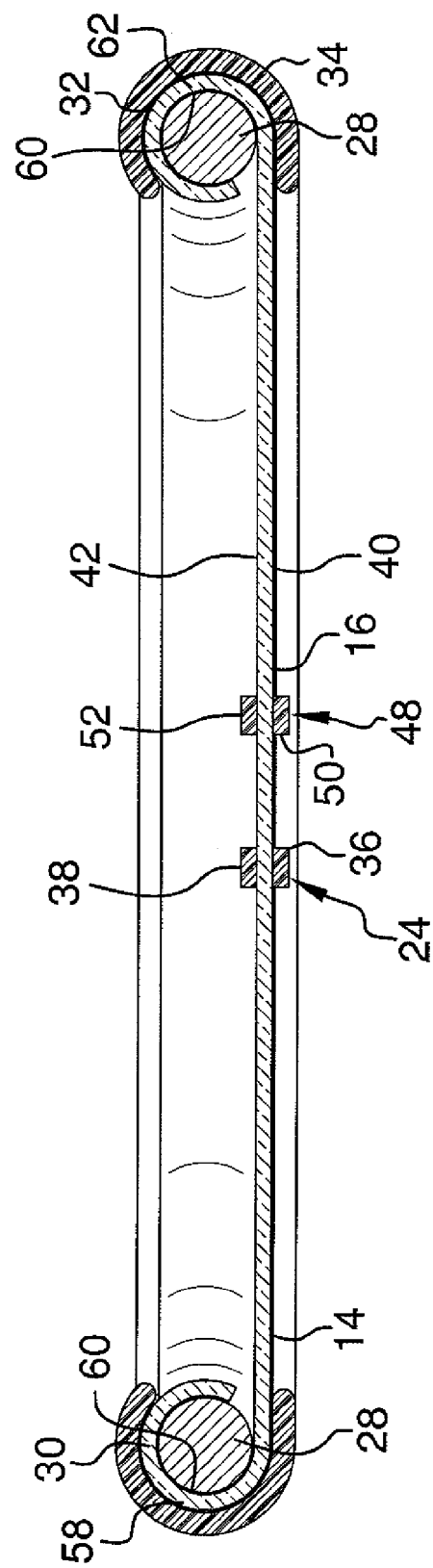
FIG. 6 is a cross-sectional view of an embodiment of the disclosure taken along line 6-6 of FIG. 1.

With reference now to the drawings, and in particular to FIGS. 1 through 6 thereof, a new phone mounting device embodying the principles and concepts of an embodiment of the disclosure and generally designated by the reference numeral 10 will be described.

As best illustrated in FIGS. 1 through 6, the phone mounting assembly 10 generally comprises a steering wheel 12 and a connection member 14 couplable to the steering wheel 12. The connection member 14 has a planar medial section 16 designed for insertion into a clip 18 of a cell phone holder 20. The cell phone holder 20 in turn holds a phone 22. A first stopping member 24 is coupled to the medial section 16 such that the first stopping member 24 is designed for restricting lateral movement of the clip 18 of the cell phone holder 20 on the connection member 14. The connection member 14, and in particular the medial section 16, may be comprised of a transparent plastic material to facilitate viewing through the connection member 14.

The medial section 16 of the connection member 14 is positioned in a middle portion 26 of the steering wheel 12 when the connection member 14 is coupled to the steering wheel 12. The steering wheel 12 has an annular grip 28. The connection member 14 has a curved first end 30 positionable to wrap around the grip 28 such that the first end 30 is coupled to the steering wheel 12. The connection member 14 also includes a curved second end 32 positionable to wrap around the grip 28 such that the second end 32 is also coupled to the steering wheel 12. A grip cover 34 may be coupled to the steering wheel 12 over the grip 28 and the first and second ends 30,32 of the connection member 14. This provides a smooth gripping surface over the first end 30 and the second end 32. The grip cover 34 further secures the connection member 14 to the steering wheel 12.

The first stopping member 24 includes a pair of sides 36,38 positioned to frictionally engage opposite faces 40,42 of the medial section 16. Thus, lateral movement of the first stopping member 24 is inhibited. The first stopping member 24 includes a pair of ends 44,46 joining the sides 36,38 of the first stopping member 24. The ends 44,46 are compressible towards each other to urge the sides 36,38 away from the faces 40,42 of the medial section 16 to facilitate lateral movement of the first stopping member 24 as desired to a selectable position on the connection member 14. A length of the sides 36,38 is greater than the height of the medial portion 16. Thus, the ends 44,46 of the first stopping member 24 are positionable in spaced relationship to the connection member 14 when the first stopping member 24 is coupled to the medial section 16. This facilitates compression of the ends 44,46 of the first stopping member 24 to move the sides 36,38 of the first stopping member 24 away from the faces 40,42 of the medial section 16.

Similarly, a second stopping member 48 is coupled to the medial section 16 such that the second stopping member 48 is also designed for restricting lateral movement of the clip 18 of the cell phone holder 20 on the connection member 14. The second stopping member 48 includes a pair of sides 50,52 positioned to frictionally engage the opposite faces 40,42 of the medial section 16. Thus, lateral movement of the second stopping member 48 is inhibited. The second stopping member 48 includes a pair of ends 54,56 joining the sides 50,52 of the second stopping member 48. The ends 54,56 of the second stopping member 48 are compressible towards each other to urge the sides 50,52 of the second stopping member 48 away from the faces 40,42 of the medial section 16 to facilitate lateral movement of the second stopping member 48. The second stopping member 48 is adjustable to a selectable position on the connection member 14 in spaced relationship to the first stopping member 24 to allow snug positioning of the clip 18 between the first stopping member 24 and the second stopping member 48. The cell phone holder 20 is therefore held in a secure position on the connection member 14. The length of the side 50,52 of the second stopping member 48 are longer than the height of the medial section 16. As such, the ends 54,56 of the second stopping member 48 are positionable in spaced relationship to the connection member 14 when the second stopping member 48 is coupled to the medial section 16. This facilitates compression of the ends 54,56 of the second stopping member 48 to move the sides 50,52 of the second stopping member 48 away from the faces 40,42 of the medial section 16.

The first end 30 of the connection member 14 is angled such that an interior first end surface 58 of the connection member 14 abuts an outer perimeter 60 of the grip 28. The second end 32 of the connection member 14 is also angled such that an interior second end surface 62 of the connection member 14 abuts the outer perimeter 60 of the grip 28. The first end 30 of the connection member 14 and the second end 32 of the connection member 14 contact the grip 28 such that the connection member 14 extends across the steering wheel 12 offset from a center 66 of the annular grip 28. This minimizes interference with air bag deployment and generally assists in positioning the phone 22 in a usable position facilitating hands free operation and viewing of the phone with minimal distraction from the roadway.

In use, the connection member 14 is attached to the steering wheel 12 by wrapping first end 30 and second end 32 around the grip 28. First stopping member 24 and second stopping member 48 are adjusted along the medial section 16 of the connection member 14 to securely hold the clip 18 of the cell phone holder 20 such that the phone 22 in the cell phone holder 20 will not move laterally on the connection member 14. The grip cover 34 may be positioned over the grip 28 to further secure the connection member 14 to the steering wheel 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A phone mounting assembly comprising:
a steering wheel having an annular grip;
a connection member couplable to said steering wheel, said connection member having a planar medial section, a first end and a second end, said first and second ends being curved and being wrapped around said steering wheel, said medial portion extending between and abutting said first and second ends;
a cell phone holder having a clip attached thereto, said clip extending over said medial section such that said medial section is positioned between a portion of said clip and said cell phone holder, said medial portion having a longitudinal axis extending through said first and second ends, said cell phone holder having a first axis being vertically oriented when a cell phone positioned therein is vertically oriented, said first axis being fixedly oriented perpendicular to said longitudinal axis;
a first stopping member coupled to said medial section such that said first stopping member is adapted for restricting lateral movement of the clip of the cell phone holder on said connection member; and
a second stopping member coupled to said medial section such that said second stopping member is adapted for restricting lateral movement of the clip of the cell phone holder on said connection member.

2. The assembly of claim 1, further including a grip cover couplable to said steering wheel over said grip and said first and second ends of said connection member.

3. The assembly of claim 2, wherein said first end of said connection member and said second end of said connection member contact said grip such that said connection member extends across said steering wheel offset from a center of said annular grip.

4. The assembly of claim 1, wherein said first stopping member includes a pair of sides positioned to frictionally engage opposite faces of said medial section whereby lateral movement of said first stopping member is inhibited, said second stopping member including a pair of sides positioned to frictionally engage opposite faces of said medial section whereby lateral movement of said second stopping member is inhibited.

5. The assembly of claim 4, wherein:
said first stopping member includes a pair of ends joining said sides of said first stopping member, said ends being compressible towards each other to urge said sides away from said faces of said medial section to facilitate lateral movement of said first stopping member to a selectable position on said connection member; and
said second stopping member includes a pair of ends joining said sides of said second stopping member, said ends of said second stopping member being compressible towards each other to urge said sides of said second stopping member away from said faces of said medial section to facilitate lateral movement of said second stopping member to a selectable position on said connection member.

6. The assembly of claim 5, wherein said ends of said first stopping member are positionable in spaced relationship to said connection member when said first stopping member is coupled to said medial section to facilitate compression of said ends of said first stopping member to move said sides of said first stopping member away from said faces of said medial section, wherein said ends of said second stopping member are positionable in spaced relationship to said connection member when said second stopping member is coupled to said medial section to facilitate compression of said ends of said second stopping member to move said sides of said second stopping member away from said faces of said medial section.

7. The assembly of claim 1, wherein said first end of said connection member is angled inward toward an upper edge of said medial portion such that an interior first end surface of said connection member abuts an outer perimeter of said grip, said second end of said connection member is angled inward toward said upper edge of medial portion such that an interior second end surface of said connection member abuts said outer perimeter of said grip, wherein a bottom edge of said medial portion has a greater length from said first end to said second end that a length of said upper edge from said first end to said second end.

8. A phone mounting assembly comprising:
a steering wheel having an annular grip;
a connection member couplable to said steering wheel, said connection member having a planar medial section, a first end and a second end, said first and second ends being curved and being wrapped around said steering wheel, said medial portion extending between and abutting said first and second ends;
a cell phone holder having a clip attached thereto, said clip extending over said medial section such that said medial section is positioned between a portion of said clip and said cell phone holder, said medial portion having a longitudinal axis extending through said first and second ends, said cell phone holder having a first axis being vertically oriented when a cell phone positioned therein is vertically oriented, said first axis being fixedly oriented perpendicular to said longitudinal axis; and a first stopping member coupled to said medial section such that said first stopping member is adapted for restricting lateral movement of the clip of the cell phone holder on said connection member; and said first end of said connection member is angled inward toward an upper edge of said medial portion such that an interior first end surface of said connection member abuts an outer perimeter of said grip, said second end of said connection member is angled inward toward said upper edge of medial portion such that an interior second end surface of said connection member abuts said outer perimeter of said grip, wherein a bottom edge of said medial portion has a greater length from said first end to said second end that a length of said upper edge from said first end to said second end.

9. The assembly of claim 8, wherein said medial section of said connection member is positioned in a middle portion of said steering wheel when said connection member is coupled to said steering wheel.

10. The assembly of claim 1, further including a grip cover couplable to said steering wheel over said grip and said first and second ends of said connection member.

11. The assembly of claim 1, wherein said first stopping member includes a pair of sides positioned to frictionally engage opposite faces of said medial section whereby lateral movement of said first stopping member is inhibited.

12. The assembly of claim 11, wherein said first stopping member includes a pair of ends joining said sides of said first stopping member, said ends being compressible towards each other to urge said sides away from said faces of said medial section to facilitate lateral movement of said first stopping member to a selectable position on said connection member.

13. The assembly of claim 12, wherein said ends of said first stopping member are positionable in spaced relationship to said connection member when said first stopping member is coupled to said medial section to facilitate compression of said ends of said first stopping member to move said sides of said first stopping member away from said faces of said medial section.

14. The assembly of claim 1, further including a second stopping member coupled to said medial section such that said second stopping member is adapted for restricting lateral movement of the clip of the cell phone holder on said connection member.

15. The assembly of claim 14, wherein said second stopping member includes a pair of sides positioned to frictionally engage opposite faces of said medial section whereby lateral movement of said second stopping member is inhibited.

16. The assembly of claim 15, wherein said second stopping member includes a pair of ends joining said sides of said second stopping member, said ends of said second stopping member being compressible towards each other to urge said sides of said second stopping member away from said faces of said medial section to facilitate lateral movement of said second stopping member to a selectable position on said connection member.

17. The assembly of claim 16, wherein said ends of said second stopping member are positionable in spaced relationship to said connection member when said second stopping member is coupled to said medial section to facilitate compression of said ends of said second stopping member to move said sides of said second stopping member away from said faces of said medial section.

18. The assembly of claim 1, wherein said first end of said connection member and said second end of said connection member contact said grip such that said connection member extends across said steering wheel offset from a center of said annular grip.

19. A phone mounting assembly comprising:
a steering wheel;
a connection member couplable to said steering wheel, said connection member having a planar medial section adapted for insertion into a clip of a cell phone holder;
a first stopping member coupled to said medial section such that said first stopping member is adapted for restricting lateral movement of the clip of the cell phone holder on said connection member;
wherein said medial section of said connection member is positioned in a middle portion of said steering wheel when said connection member is coupled to said steering wheel;
said steering wheel having an annular grip;
said connection member having a curved first end positionable to wrap around said grip such that said first end is coupled to said steering wheel;
wherein said connection member includes a curved second end positionable to wrap around said grip such that said second end is coupled to said steering wheel;
a grip cover couplable to said steering wheel over said grip and said first and second ends of said connection member;
wherein said first stopping member includes a pair of sides positioned to frictionally engage opposite faces of said medial section whereby lateral movement of said first stopping member is inhibited;
wherein said first stopping member includes a pair of ends joining said sides of said first stopping member, said ends being compressible towards each other to urge said sides away from said faces of said medial section to facilitate lateral movement of said first stopping member to a selectable position on said connection member;
wherein said ends of said first stopping member are positionable in spaced relationship to said connection member when said first stopping member is coupled to said medial section to facilitate compression of said ends of said first stopping member to move said sides of said first stopping member away from said faces of said medial section;
a second stopping member coupled to said medial section such that said second stopping member is adapted for restricting lateral movement of the clip of the cell phone holder on said connection member;
wherein said second stopping member includes a pair of sides positioned to frictionally engage opposite faces of said medial section whereby lateral movement of said second stopping member is inhibited;
wherein said second stopping member includes a pair of ends joining said sides of said second stopping member, said ends of said second stopping member being compressible towards each other to urge said sides of said second stopping member away from said faces of said medial section to facilitate lateral movement of said second stopping member to a selectable position on said connection member;
wherein said ends of said second stopping member are positionable in spaced relationship to said connection member when said second stopping member is coupled to said medial section to facilitate compression of said ends of said second stopping member to move said sides of said second stopping member away from said faces of said medial section;

wherein said first end of said connection member is angled such that an interior first end surface of said connection member abuts an outer perimeter of said grip;

wherein said second end of said connection member is angled such that an interior second end surface of said connection member abuts said outer perimeter of said grip; and wherein said first end of said connection member and said second end of said connection member contact said grip such that said connection member extends across said steering wheel offset from a center of said annular grip.

* * * * *